Patented Oct. 2, 1951

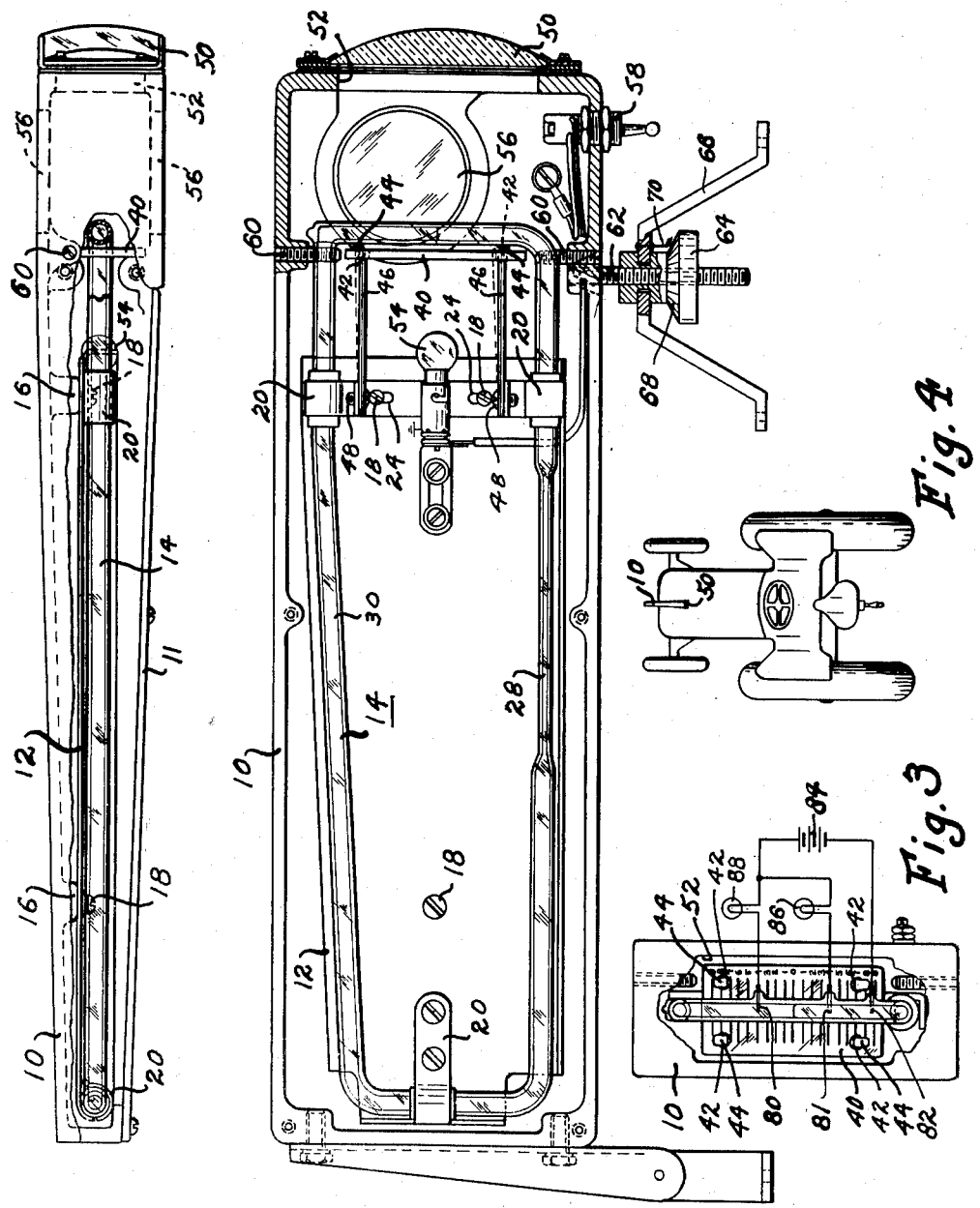

2,570,122

UNITED STATES PATENT OFFICE 2,570,122

LEVELING AND CONTOURING APPARATUS

Frederick W. Heckert and Harry W. Lake, Dayton, Ohio

Application April 1, 1949, Serial No. 84,859

5 Claims. (Cl. 33—209)

This invention relates to a leveling device and more particularly to a device especially suitable for use on road rollers, bulldozers, tractors, and the like used in contouring and contour plowing.

This invention constitutes an improvement over the level shown in the copending application Serial Number 6,836 filed February 7, 1948, by Robert C. Nevin, and other leveling devices which have been used from time to time.

Various types of leveling devices have been designed for use in contouring and contour plowing and the like, but they have not been too practical due to erratic operation and impractical design features. A number of problems are present in designing a level of this type which are not present in ordinary leveling devices. In the first place, the level is usually adapted to be mounted on a machine which jogs along over rough terrain and consequently conventional levels would give false indications or the indicator thereof would be bobbing up and down so much that its movement would not mean anything. Also many of the leveling devices which have been proposed have small scales which are hard to see and result in fatigue to the eyes on the part of the operator who must closely watch the level indicator much of the time.

It is an object of this invention to provide an instrument in which means is provided for dampening the indicating element so as to avoid false indications resulting from traveling over small bumps and the like.

Another object of this invention is to provide an indicator which avoids needless eyestrain such as results from trying to observe a poorly designed scale or a scale which is mounted close to the operator. Since the operator must watch both the scale and the ground ahead, it is obvious that if the scale is close to the operator, it will necessitate frequent refocusing of the eyes each time the operator looks from the close-up scale to the more distant terrain over which the vehicle must be guided. Thus, it is an object of this invention to provide a level indicating instrument having a magnifying device for the scale so that the instrument can be placed at the front end of the tractor or the like or far enough away from the operator to make it possible for the operator to observe both the indicator and the ground ahead without any appreciable refocusing of the eyes.

Since instruments of this type are called upon to be used out in the hot sun and also in sub-zero weather, they must be unaffected by extreme temperature changes. It is an object of this invention to provide an instrument which is provided with an inexpensive arrangement for compensating for such temperature changes.

Another object of this invention is to provide a compact, inexpensive, yet reliable, level indicating instrument.

Still another object of this invention is to provide an improved mounting arrangement for the level indicator which is so designed as to make it possible to shift the effective zero setting of the instrument when it is desired to operate the tractor or the like on a given incline.

Other objects and advantages reside in the construction of parts, the combination thereof and the mode of operation, as will become more apparent from the following description.

In the drawing:

Figure 1 is a side elevational view, with parts broken away, showing a preferred embodiment of our invention;

Figure 2 is a plan view with parts broken away;

Figure 3 is an end elevational view, with parts broken away, showing the construction of the scale in relationship to the level indicator; and Figure 4 is a plan view, largely diagrammatic, showing the location of the indicator on a conventional tractor such as used in contour plowing.

Referring now to the drawing wherein we have shown a preferred embodiment of our invention, reference numeral 10 designates a housing or main frame which is preferably made of cast aluminum or some similar inexpensive light weight material capable of standing up under various climatic conditions. The main housing 10 serves to support an inner frame 12 which in turn supports a continuous section of tubing 14 which is constructed and arranged as shown. The side wall of the housing 10 is provided with integrally formed embossed portions 16 provided with tapped recesses for receiving the cap screws 18 which serve to hold the inner frame 12 in the correct adjustment within the housing 10.

In referring to Figure 1, it will be noted that the tube 14 is held in place on the inner frame 12 by means of strap members 20. Suitable slots 24 are provided which allow a limited amount of relative movement between the mounting straps 20 and the associated cap screws 18 which hold the inner frame 12 and the strap member 20 in assembled relationship on the main frame 10.

A removable cover 11 has been provided for enclosing the mechanism disposed within the main frame 10. In referring to Figure 2 of the drawing, it will be observed that the main frame or housing 10 is tapered, with the result that it is much narrower at the one end than at the other end.

The tube 14 is adapted to be partially filled with a suitable liquid which is used for indicating to the operator of a tractor or the like when the tractor is moving along a slope at a constant level or at a given deviation from the level. In order to avoid surges due to minor jarring of the instrument in use, the tube 14 is provided with a restricted portion 28 in its bottom leg. This restricted portion preferably extends for a distance of approximately four inches and serves to control the rate of liquid column surge. The upper passage of the tube 14 has been designated by the reference numeral 30 and is arranged at a slight incline for the purpose of providing good drainage for any of the liquid that might momentarily flow into the upper leg of the tube after the instrument has been tilted an excessive amount.

A scale 40 has been provided directly behind the one leg of the tube 14. The scale 40 is provided with suitable indicia which for the purposes of illustration are in terms of degrees. When the instrument is held in a perfectly level position, the liquid 26 within the tube 14 will be at a level directly opposite the zero mark on the scale 40, but as the instrument is tilted, the liquid level will either rise or fall, depending upon the direction in which the instrument is tilted and the number of degrees which the instrument is tilted will be indicated by the deviation in the liquid level from the zero mark. Thus, if the instrument or the piece of machinery on which the instrument is mounted is going up or down on a slope of two degrees, the liquid level will be in line with the corresponding 2° mark.

The scale 40 is preferably made of translucent material and is spaced from the end of the housing 10 a distance sufficient to make the spherical magnifying lens 50 mounted adjacent the viewing window 52 effective to enlarge the scale 40. A light 54 has been provided directly behind the scale 40, as shown, for lighting up the scale. By virtue of this arrangement, the device can be used both day and night with a minimum amount of eyestrain. Side windows 56 have been provided directly in front of the scale 40, as shown, so as to provide for improved daylight illumination of the scale. A switch 58 has been provided for turning on and off the light 54 so that when the instrument is not in use and when the daylight is adequate for illuminating the scale 40, the light 54 may be turned off.

In order to compensate for changes in liquid level within the tube 14 which may result from expansion or contraction of the liquid within the tube 14, there is provided a pair of bimetallic supporting elements 46 for the scale 40 which automatically adjust the position of the scale an amount sufficient to compensate for any change in the liquid level within the tube 14 resulting from temperature changes. As indicated in Figure 1 of the drawing, the scale 40 is provided with four apertures 42 through which the hooked ends 44 of bimetallic elements 46 pass. The inner ends of the bimetallic elements 46 are held in fixed relationship relative to the inner frame 12 by means of the mounting screws 48. By virtue of the above described arrangement, it is apparent that the bimetallic elements 46 constitute the sole means for supporting the scale 40. The bimetallic elements 46 are so arranged that as the ambient air temperature increases, the scale 40 will be elevated an amount sufficient to compensate for the change in the volume of liquid within the glass tube 14.

Adjustable stops 60 have been provided, as shown, for limiting the movement of the scale 40. These stops are adjustable screws which serve to prevent excessive shifting of the scale 40 at the extreme temperature ranges.

The instrument design shown and described herein makes it possible to mount the instrument in a very narrow case whereby it offers a minimum amount of obstruction to the view ahead. Furthermore, the enlarging lens 50 makes it possible to mount the instrument adjacent the front end of the tractor or other vehicle on which it is to be used, as shown in Figure 4 of the drawing, so as not to unduly obstruct the operator's view of the ground ahead and so as to eliminate the need for the operator to look to one side or the other or materially refocus his eyes while steering.

Since there may be times when it is desired to construct a terrace or the like having a predetermined number of degrees slope, there is provided an adjustable mounting means for raising and lowering one end of the housing 10. This adjusting means comprises a threaded stud 62 carried directly by the housing 10 which cooperates with a calibrated nut 64 journalled in a stationary bracket 66 which is adapted to be secured directly to the tractor or other vehicle on which the instrument is mounted. The nut 64 is provided with indicia 68 which facilitates making exact adjustments. A pointer 70 carried by the stationary bracket 66 is arranged adjacent the indicia 68 as shown.

While the apparatus shown herein is primarily intended for giving visual indication of any deviation from a given standard grade for guiding the operator, it is obvious that the instrument could be used equally well in combination with automatic mechanism for steering and/or adjusting the angle of some contouring element such as the blade of a bulldozer.

As indicated in Figure 3 of the drawing (for purposes of illustrating one possible electrical control circuit), the one portion of the tube has been provided with electric terminals or contacts 80, 81 and 82 which are arranged to extend into the tube and which cooperate with the liquid in the tube 14 for closing the circuits to the lights 86 and 88 as shown. By using a liquid which is capable of carrying current, it is possible to connect the lower terminal 82 to one side of a source of power, such as the battery 84, and to have the liquid close the circuit from the contact 82 to one or both of the contacts 80 and 81. With the liquid level as indicated in Figure 3 of the drawings, current will be supplied to the lamp 86 which may be located in any suitable place on the vehicle. In the event that the vehicle travels up a hill having a grade sufficient to cause the liquid in the tube to reach the contact 80, the light 88 will also be energized. Likewise, if the vehicle goes down a steep enough incline, the circuit to both lights 86 and 88 will be broken. For purposes of illustration, the contacts 80 and 81 have been shown as located four spaces from the zero mark, whereas these contacts could be placed at any desired distance from the zero mark or even at the zero mark, depending upon the purpose to be served.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a level, an outer housing, an inner frame, means for supporting said inner frame within said outer housing, a tube, means for adjustably supporting said tube on said inner frame, said tube being partially filled with liquid and having a pair of vertically disposed portions connected into a continuous loop by means of upper and lower connecting tube portions, one of said vertical portions being shorter than the other vertical portion, a scale disposed adjacent the longer of said vertical portions, and bimetallic thermostatic means secured to said inner frame and having freely movable portions constituting the sole means for supporting said scale, said thermostatic means serving to adjust the position of said scale relative to said liquid so as to compensate for changes in the volume of liquid resulting from temperature changes.

2. In a level, an outer housing, an inner frame, means for supporting said inner frame within said outer housing, a tube, means for adjustably supporting said tube on said inner frame, said tube being partially filled with liquid and having a pair of vertically disposed portions connected into a continuous loop by means of upper and lower connecting tube portions, one of said vertical portions being shorter than the other vertical portion, a scale disposed adjacent the longer of said vertical portions, bimetallic thermostatic means secured to said inner frame and having freely movable portions constituting the sole means for supporting said scale, said thermostatic means serving to adjust the position of said scale relative to said liquid so as to compensate for changes in the volume of liquid resulting from temperature changes, and adjustable stop means carried by said outer housing for limiting the movement of said scale.

3. In a grade indicator level for mounting on the front end of a tractor, a relatively long and narrow one piece cast metal outer housing, said housing being narrower at the one end than at the other end, an inner frame supported within said outer housing, a transparent tube partially filled with a liquid supported on said inner frame and having a vertical portion adjacent the widest end of said outer housing, a scale supported by said inner frame adjacent said vertical portion for indicating the liquid level in said one portion, said outer housing having a window in said widest end through which said scale and the liquid level in said tube may be observed, and a lens in said window for magnifying said scale.

4. In combination with a tractor having a driver's seat towards the rear thereof, a level, means for supporting said level in a predetermined position adjacent the front end of said tractor, said level comprising a relatively long and narrow housing adapted to be mounted with its longitudinal axis substantially in alignment with the normal direction of travel of said tractor, said housing being narrower at the front end than at the rear end, said level comprising a tube partially filled with a liquid and having a vertical portion arranged adjacent the rear end of said housing, a scale adjacent said tube for indicating the deviation of the liquid level from a given normal, a window in the rear end of said housing through which said scale and the liquid level in said tube may be observed, and a lens in said window for magnifying said scale.

5. A device for use on the front end of a tractor comprising in combination, a relatively long and narrow housing adapted to be mounted with its longitudinal axis substantially in alignment with the normal direction of travel of the tractor, said housing being narrower at the front end than at the rear end, a tube partially filled with a liquid and having a vertical portion arranged adjacent the rear end of said housing, means for adjustably supporting said tube within said housing, a scale adjacent said tube for indicating the deviation of the liquid level from a given normal, a window in the rear end of said housing through which said scale and the liquid level in said tube may be observed, and a lens in said window for magnifying said scale.

FREDERICK W. HECKERT.
HARRY W. LAKE.

REFERENCES CITED

The following references are of record in the file of this patent:

UNITED STATES PATENTS

| Number | Name | Date |
|---|---|---|
| 631,976 | Whittemore | Aug. 29, 1899 |
| 794,697 | Beck | July 11, 1905 |
| 1,261,776 | D'Ascanio | Apr. 9, 1918 |
| 1,305,935 | Rieker | June 3, 1919 |
| 1,375,278 | Clayton | Apr. 19, 1921 |
| 1,970,883 | Bryant | Aug. 21, 1934 |
| 2,002,183 | Lecarpentier | May 21, 1935 |
| 2,019,178 | Elsom | Oct. 29, 1935 |
| 2,267,115 | Linebarger | Dec. 23, 1941 |
| 2,292,241 | Reeves | Aug. 4, 1942 |
| 2,335,893 | Altenberg | Dec. 7, 1943 |
| 2,350,240 | Leister | May 30, 1944 |
| 2,353,911 | Leveille | July 18, 1944 |
| 2,362,325 | Thurmond | Nov. 7, 1944 |
| 2,379,350 | Gubrud | June 26, 1945 |
| 2,477,927 | Hanson | Aug. 2, 1949 |

FOREIGN PATENTS

| Number | Country | Date |
|---|---|---|
| 319,815 | Germany | 1917 |
| 489,706 | Great Britain | 1938 |